United States Patent
Kimmel et al.

(10) Patent No.: US 10,527,853 B2
(45) Date of Patent: Jan. 7, 2020

(54) POLYCHROMATIC LIGHT OUT-COUPLING APPARATUS, NEAR-EYE DISPLAYS COMPRISING THE SAME, AND METHOD OF OUT-COUPLING POLYCHROMATIC LIGHT

(71) Applicant: Magic Leap, Inc., Plantation, FL (US)

(72) Inventors: Jyrki Kimmel, Tampere (FI); Toni Jarvenpaa, Akaa (FI); Peter Eskolin, Tampere (FI); Marja Salmimaa, Tampere (FI)

(73) Assignee: Magic Leap, Inc., Plantation, FL (US)

(*) Notice: Subject to any disclaimer, the term of this patent is extended or adjusted under 35 U.S.C. 154(b) by 193 days.

(21) Appl. No.: 15/843,258

(22) Filed: Dec. 15, 2017

(65) Prior Publication Data

US 2018/0188540 A1 Jul. 5, 2018

(30) Foreign Application Priority Data

Dec. 30, 2016 (EP) .................................. 16207441

(51) Int. Cl.
*G02B 27/01* (2006.01)
*G02B 27/00* (2006.01)
*G02B 5/18* (2006.01)

(52) U.S. Cl.
CPC ....... *G02B 27/0172* (2013.01); *G02B 5/1842* (2013.01); *G02B 5/1866* (2013.01); *G02B 27/0081* (2013.01); *G02B 2027/0112* (2013.01); *G02B 2027/0116* (2013.01); *G02B 2027/0123* (2013.01); *G02B 2027/0125* (2013.01); *G02B 2027/0132* (2013.01)

(58) Field of Classification Search
CPC ............... G02B 27/0172; G02B 27/01; G02B 27/0081; G02B 5/1842; G02B 5/1866; G02B 2027/0112; G02B 2027/0116; G02B 2027/0123; G02B 2027/0125; G02B 2027/0132
USPC ....................................................... 351/567
See application file for complete search history.

(56) References Cited

U.S. PATENT DOCUMENTS

| 7,573,640 | B2* | 8/2009 | Nivon | G02B 5/1814 345/7 |
| 7,751,662 | B2* | 7/2010 | Kleemann | G02B 5/1861 385/31 |
| 9,581,820 | B2* | 2/2017 | Robbins | G02B 5/30 |
| 9,671,615 | B1* | 6/2017 | Vallius | G02B 27/0172 |
| 10,018,844 | B2* | 7/2018 | Levola | G02B 27/0172 |

(Continued)

*Primary Examiner* — William R Alexander
(74) *Attorney, Agent, or Firm* — Stephen M. De Klerk

(57) ABSTRACT

The present invention provides an apparatus including a first out-coupling diffractive optical element and a second out-coupling diffractive optical element. Each of the first and second out-coupling diffractive optical elements includes a first region having a first repeated diffraction spacing, d1, and a second region adjacent to the first region having a second repeated diffraction spacing, d2, different from the first spacing, d1. The first region of the first out-coupling diffractive optical element is superposed on and aligned with the second region of the second out-coupling diffractive optical element. The second region of the first out-coupling diffractive optical element is superposed on and aligned with the first region of the second out-coupling diffractive optical element.

15 Claims, 9 Drawing Sheets

(56) References Cited

U.S. PATENT DOCUMENTS

| | | | | |
|---|---|---|---|---|
| 2006/0126181 A1* | 6/2006 | Levola | G02B 27/0081 |
| | | | 359/567 |
| 2006/0221448 A1* | 10/2006 | Nivon | G02B 5/1814 |
| | | | 359/572 |
| 2007/0188837 A1* | 8/2007 | Shimizu | G02B 5/203 |
| | | | 359/13 |
| 2008/0043334 A1* | 2/2008 | Itzkovitch | G02B 5/1814 |
| | | | 359/569 |
| 2009/0245730 A1* | 10/2009 | Kleemann | G02B 5/1861 |
| | | | 385/37 |
| 2010/0232016 A1* | 9/2010 | Landa | G02B 5/1814 |
| | | | 359/466 |
| 2010/0296163 A1* | 11/2010 | Saarikko | G02B 5/1814 |
| | | | 359/567 |
| 2011/0050655 A1* | 3/2011 | Mukawa | G02B 27/0172 |
| | | | 345/204 |
| 2014/0168260 A1* | 6/2014 | O'Brien | G09G 5/377 |
| | | | 345/633 |
| 2015/0138248 A1* | 5/2015 | Schrader | G02B 27/017 |
| | | | 345/690 |
| 2015/0269784 A1* | 9/2015 | Miyawaki | G02B 27/017 |
| | | | 345/633 |
| 2016/0077338 A1* | 3/2016 | Robbins | G02B 27/0172 |
| | | | 345/8 |
| 2016/0085300 A1* | 3/2016 | Robbins | G06F 3/013 |
| | | | 345/633 |

\* cited by examiner

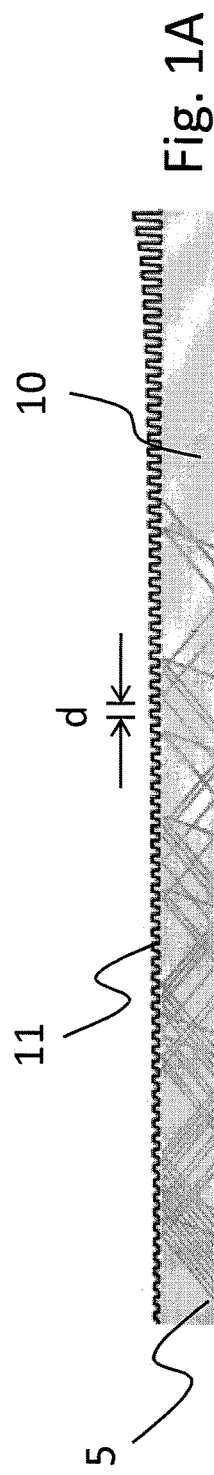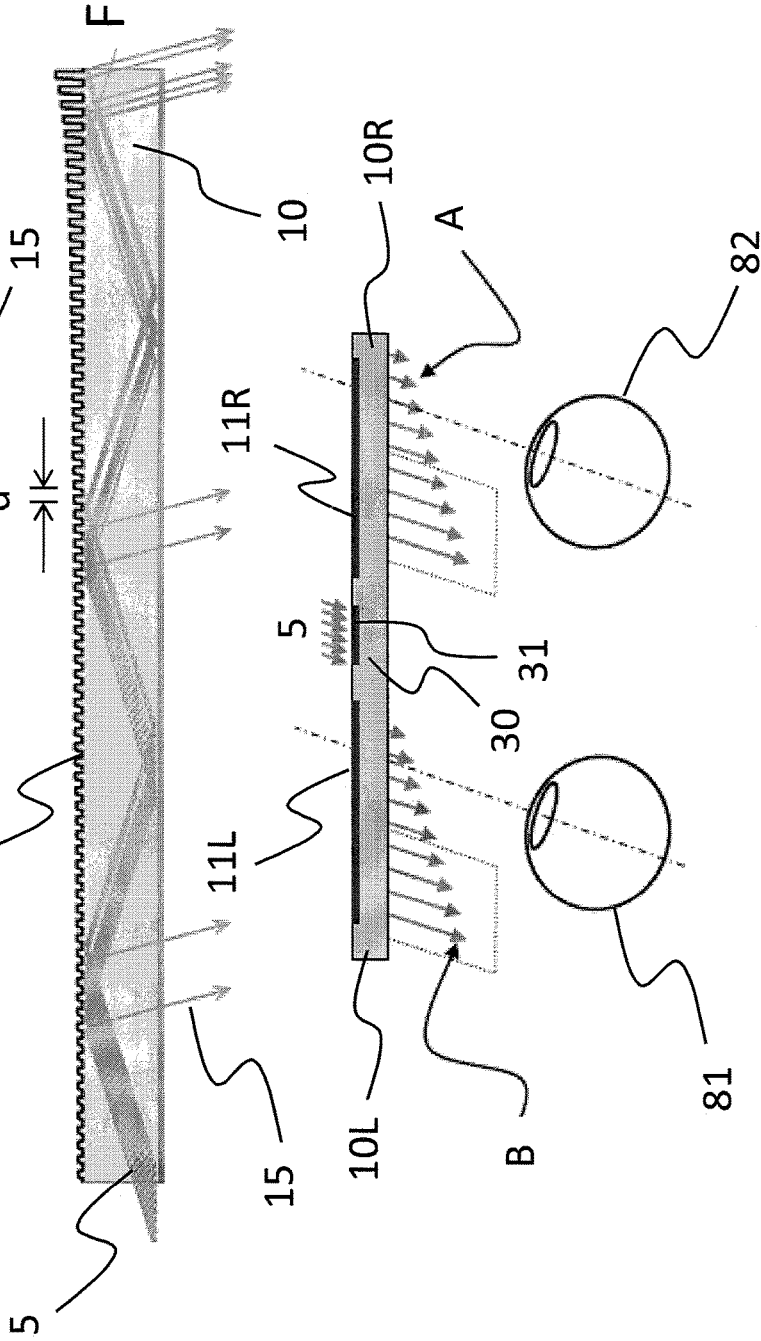
Fig. 1A
Fig. 1B
Fig. 1C

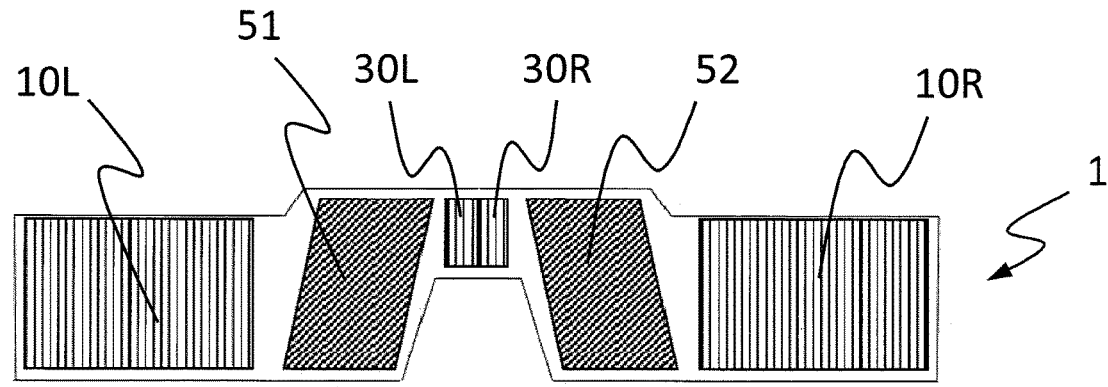
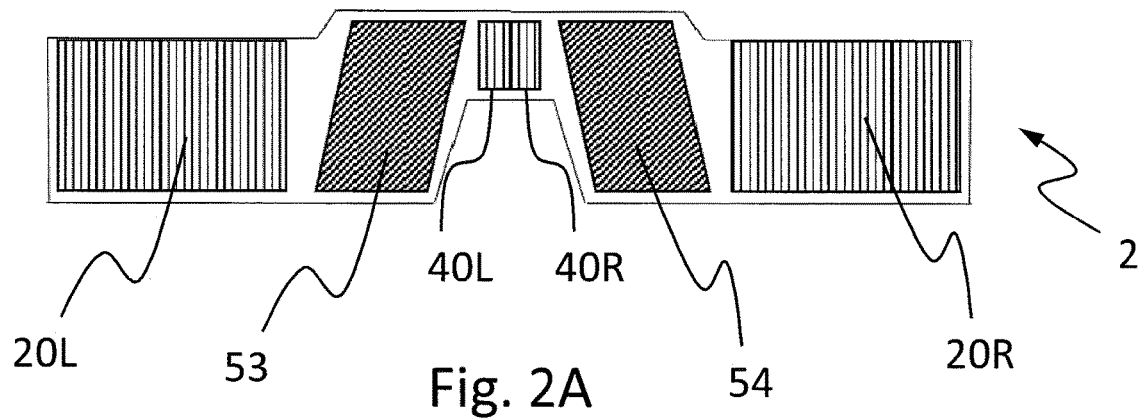
Fig. 2A
Fig. 2B

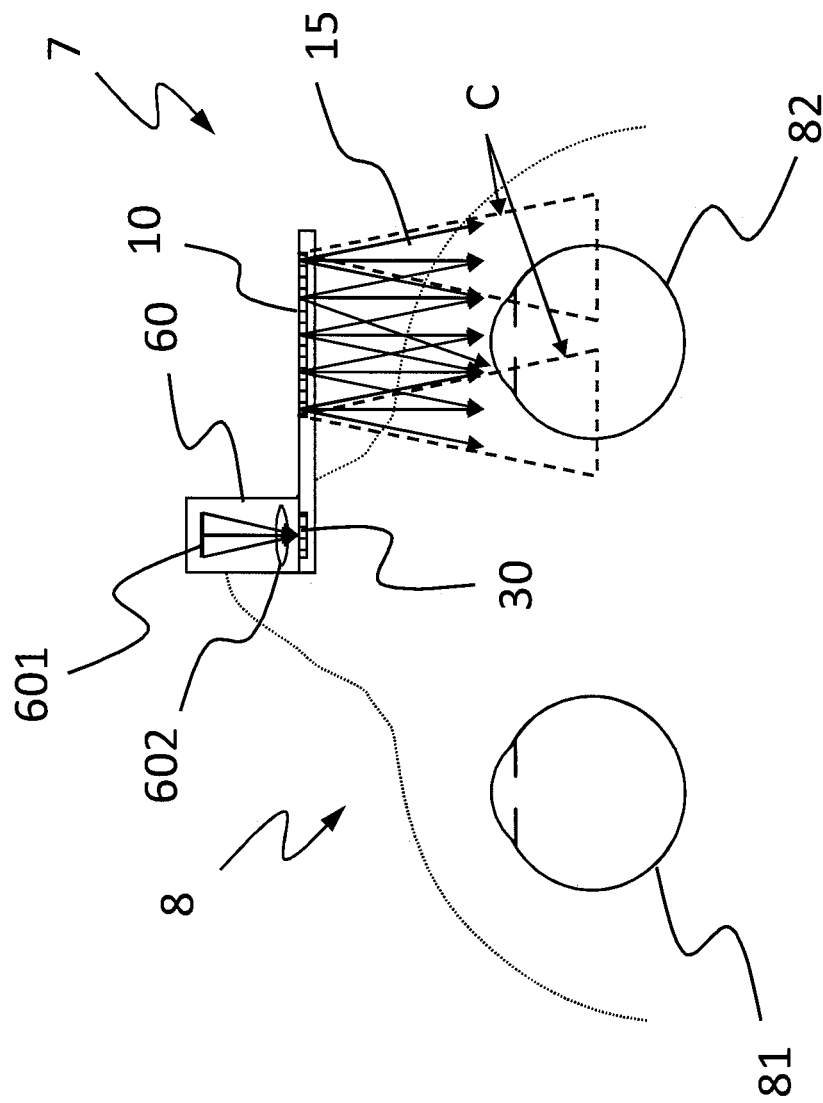

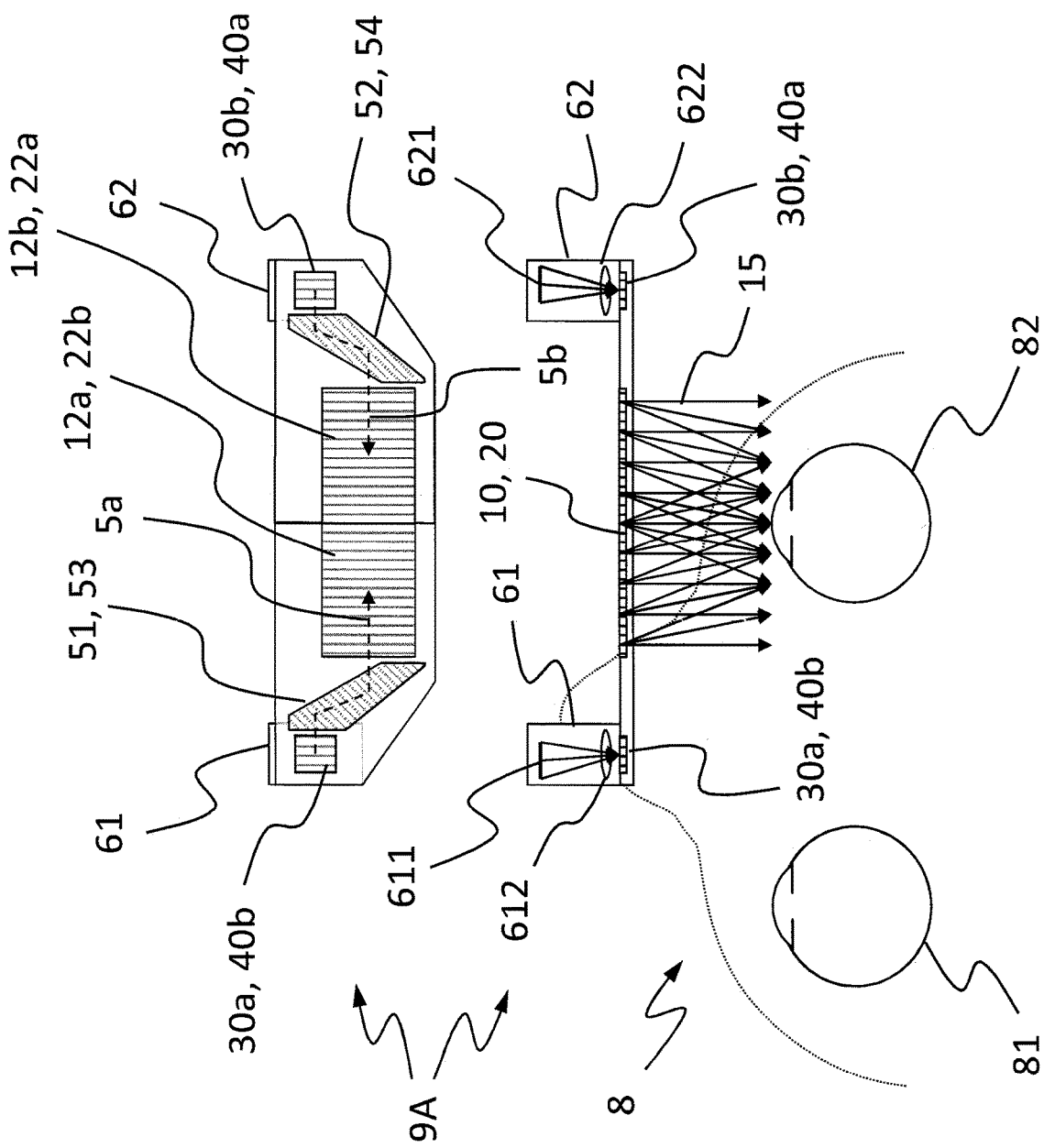

POLYCHROMATIC LIGHT OUT-COUPLING APPARATUS, NEAR-EYE DISPLAYS COMPRISING THE SAME, AND METHOD OF OUT-COUPLING POLYCHROMATIC LIGHT

TECHNOLOGICAL FIELD

Embodiments of the present invention relate to a polychromatic light out-coupling apparatus, near-eye displays comprising the same, and a method of out-coupling polychromatic light. In particular, they relate to monocular and binocular near-eye displays comprising such a polychromatic light out-coupling apparatus providing a wide field of view, and to a method of using the same to view a pattern of polychromatic light, such as a colour image or a colour video image sequence.

BACKGROUND

FIGS. 1A and 1B schematically show light 5 entering from the left into a diffractive optical element 10 comprising a diffractive layer 11 having a repeated diffraction spacing, d. The light 5 is transmitted through the interior of the diffractive optical element 10 by total internal reflection and is diffracted by the diffractive layer 11. When diffracted, some of the light 5 is out-coupled from the diffractive optical element 10, as represented by arrows 15. The angles $\theta_n$ of the out-coupled light for each diffracted order n are determined by the wavelength $\lambda$ of the light source and the repeated diffraction spacing d of the diffractive layer 11 according to the well-known equation:

$$d(\sin \theta_n + \sin \theta_i) = n\lambda \quad \text{[Eqn. 1]}$$

where $\theta_i$ is the angle of incident light, n is an integer, $\theta_n$ is the angle of the diffracted light and $\lambda$ is the wavelength of the light. As shown in FIG. 1A, incoming light 5 entering the diffractive optical element 10 at smaller angles generally travels a lesser distance by each total internal reflection before being out-coupled by diffraction, so that the out-coupled light 15 is mostly concentrated near to where the light has entered the diffractive optical element 10, fading out rapidly from left to right. On the other hand, as shown in FIG. 1B, incoming light 5 entering the diffractive optical element 10 at larger angles can travel a greater distance by each total internal reflection before being out-coupled by diffraction, so that the out-coupled light 15 is mostly concentrated far from where the light has entered the diffractive optical element 10. Similar considerations would apply in a left-right mirror image if the incoming light 5 were instead to enter the diffractive optical element 10 from the right in FIGS. 1A and 1B, rather than from the left.

FIG. 1C schematically shows a pair of such out-coupling diffractive optical elements 10L, 10R, each of which comprises a respective diffractive layer 11L, 11R. The out-coupling diffractive optical elements 10L, 10R are arranged in optical communication with an in-coupling diffractive optical element 30 comprising a similar diffractive layer 31 to that of the out-coupling diffractive optical elements 10L, 10R and having the same repeated diffraction spacing d. The in-coupling diffractive optical element 30 receives incoming light 5, which is diffracted by diffractive layer 31 and transmitted by total internal reflection to the out-coupling diffractive optical elements 10L, 10R.

FIG. 1C also schematically shows eyeballs 81, 82 of a viewer gazing at the out-coupling diffractive optical elements 10L, 10R. As may be understood from FIG. 1A, for a viewer looking to the right, as shown in FIG. 1C, the out-coupled light 15 will therefore have lowered brightness in the region A, whereas light in the region B will fall outside the gaze of the viewer and be wasted. On the other hand, as may also be understood from FIG. 1B, for a viewer looking to the left, the out-coupled light 15 will similarly have lowered brightness in the region B and will fall outside the gaze of the viewer in region A and be wasted.

FIG. 2A schematically shows a pair of components 1, 2 of an apparatus for out-coupling polychromatic light, for use, for example, in a binocular near-eye display. By polychromatic light is meant light of at least two different wavelengths. The components 1, 2 each have left and right halves which are mirror images of each other, configured to out-couple light to a pair of eyes. Component 1 therefore comprises a pair of out-coupling diffractive optical elements 10L, 10R, a pair of corresponding in-coupling diffractive optical elements 30L, 30R, and a pair of intermediate optical elements 51, 52, which respectively direct light from the in-coupling diffractive optical element 30L to the out-coupling diffractive optical element 10L and from the in-coupling diffractive optical element 30R to the out-coupling diffractive optical element 10R. Component 2 similarly comprises a pair of out-coupling diffractive optical elements 20L, 20R, a pair of corresponding in-coupling diffractive optical elements 40L, 40R, and a pair of intermediate optical elements 53, 54, which respectively direct light from the in-coupling diffractive optical element 40L to the out-coupling diffractive optical element 20L and from the in-coupling diffractive optical element 40R to the out-coupling diffractive optical element 20R.

Components 1 and 2 differ from each other in that the in- and out-coupling diffractive optical elements 30L, 30R, 10L, 10R of component 1 have a first repeated diffraction spacing, $d_1$, whereas the in- and out-coupling diffractive optical elements 40L, 40R, 20L, 20R of component 2 have a second repeated diffraction spacing, $d_2$, which is different from the first spacing, $d_1$. Components 1 and 2 can therefore provide respective channels of optimized efficiency for diffracting light in two different wavelength bands. For example, component 1 may provide a channel for red light and component 2 may provide a channel for green-blue light. Thus if components 1 and 2 are superposed one on top of the other, as is schematically represented in FIG. 2B, and if the optical elements of each component are carefully aligned, polychromatic light from a single display can be projected into the in-coupling diffractive optical elements 30L, 30R, 40L, 40R. Light in two different wavelength bands will then be out-coupled from elements 10L and 20L and will re-combine to provide polychromatic light to a viewer's left eye, whilst light in two different wavelength bands will also be out-coupled from elements 10R and 20R and re-combine to provide polychromatic light to the viewer's right eye. A similar arrangement can be used in a monocular near-eye display to out-couple polychromatic light to a single eye by using only a left or right half of each of the components 1 and 2.

The components 1, 2 may each be understood as being similar in construction and function to the in- and out-coupling diffractive optical elements described above in relation to FIG. 1C. Therefore, they suffer from the same problems as were explained above in relation to FIG. 1C. Typically, for example, if the components 1, 2 are incorporated into a binocular near-eye display, they will provide a field of view of less than about 40 degrees. The "eye box" can be increased by scaling the size of all of the optical elements, starting with the display, but this is undesirable, from the point of view not only of cost, but also of wearability. On the other hand, a much wider field of view would be highly desirable, considering that the natural field of view of a healthy human can extend beyond 180 degrees in the horizontal direction.

BRIEF SUMMARY

According to various, but not necessarily all, embodiments of the invention there is provided an apparatus comprising a first out-coupling diffractive optical element and a second out-coupling diffractive optical element. Each of the first and second out-coupling diffractive optical elements comprises a first region having a first repeated diffraction spacing, $d_1$, and a second region adjacent to the first region having a second repeated diffraction spacing, $d_2$, different from the first spacing, $d_1$. The first region of the first out-coupling diffractive optical element is superposed on and aligned with the second region of the second out-coupling diffractive optical element. The second region of the first out-coupling diffractive optical element is superposed on and aligned with the first region of the second out-coupling diffractive optical element.

With such an apparatus, light of two different wavelengths from two different respective in-coupling diffractive optical elements can be directed into one and the same out-coupling diffractive optical element from different locations and/or directions for viewing by a single eye. Light of one of the two wavelengths is out-coupled from the first region of the out-coupling diffractive optical element, whereas light of the other of the two wavelengths is out-coupled from the second region of the same out-coupling diffractive optical element. Thus if two such out-coupling diffractive optical elements are superposed one on top of the other, with the first region of the first out-coupling diffractive optical element carefully aligned with the second region of the second out-coupling diffractive optical element, and with the second region of the first out-coupling diffractive optical element carefully aligned with the first region of the second out-coupling diffractive optical element, a viewer can see polychromatic light in a field of view which is much wider than from an arrangement such as shown and described above in relation to FIGS. 2A and 2B. The resulting technical effect may also be understood as allowing polychromatic light to be coupled into the two superposed out-coupling diffractive optical elements from two different locations and/or directions, for example from opposing directions. Thus regardless of whether the viewer is looking to the left or to the right, they will always be able to view polychromatic light which has not travelled far through the two out-coupling diffractive optical elements by total internal reflection from a respective one of the in-coupling diffractive optical elements before the light is out-coupled by diffraction from the corresponding region of one of the two out-coupling diffractive optical elements. The out-coupled light is therefore less subject to fade-out or vignetting at viewing angles which are much wider than conventionally. In principle, all other things being equal, the field of view could be doubled in comparison to a conventional arrangement, although the actual field of view can be optimized according to ergonomic requirements and other design considerations.

Preferably, the first and second out-coupling diffractive optical elements are both substantially rectangular and have a pair of long edges and a pair of short edges, and a division between the first region and the second region of the first and second out-coupling diffractive optical elements is located substantially equidistant between the pair of short edges.

Thus, according to such an embodiment, the eye of a viewer of the first and second out-coupling diffractive optical elements may be positioned substantially perpendicular to the division, for equal viewing of the first and second regions.

The length of the long edges of the first and second out-coupling diffractive optical elements may be different between different embodiments, but the division between the first region and the second region should nonetheless be maintained substantially equidistant from each of the pair of short edges between the different embodiments.

Any of the diffractive optical elements may, for example, be a hologram, such as a volume hologram, or a diffraction grating, such as a surface relief diffraction grating. By "repeated diffraction spacing" is meant the separation between repeated diffractive features of a diffractive optical element. The repeated diffractive features may be oriented parallel to each other in any preferred direction. For example, if the diffractive optical elements are to be incorporated into a near-eye display, the repeated diffractive features may preferably be oriented such that in use of the near-eye display, they will be substantially parallel to either a vertical or a horizontal axis of the display.

If the first and second out-coupling diffractive optical elements are both diffraction gratings, the first region of each grating may comprise rulings of the first spacing, $d_1$, and the second region of each grating may comprise rulings of the second spacing, $d_2$. Preferably, the rulings of the first region of each grating are substantially parallel to the rulings of the second region of the same grating. This has the advantage of allowing for easy manufacture of each of the first and second out-coupling diffractive optical elements by ruling them in a single manufacturing operation. In an alternative preferred embodiment, the rulings of the first region of each grating may instead be substantially perpendicular to the rulings of the second region of the same grating. This has the advantage of allowing light to be directed into each grating region from directions which are perpendicular to each other, giving greater design freedom to adapt to ergonomic requirements.

Preferably, the apparatus further comprises a first pair of in-coupling diffractive optical elements having the first repeated diffraction spacing, d1, which are configured to direct light to the first region of respective ones of the first and second out-coupling diffractive optical elements, and a second pair of in-coupling diffractive optical elements having the second repeated diffraction spacing, d2, which are configured to direct light to the second region of respective ones of the first and second out-coupling diffractive optical elements.

If so, the apparatus preferably also comprises at least one intermediate optical element configured to transmit light from a respective one of the in-coupling diffractive optical elements to a region of a respective one of the out-coupling diffractive optical elements having the same spacing as the respective one of the in-coupling diffractive optical elements. Such an intermediate optical element may be positioned along one of the long edges or along one of the short edges of the respective one of the out-coupling diffractive optical elements, according to the orientation, relative to the short or long edge, of the repeated diffractive features of said region having the same spacing as the respective one of the in-coupling diffractive optical elements. For example, if the repeated diffractive features of the region are parallel to the long edge of the out-coupling diffractive optical element, then the intermediate optical element may be positioned along the long edge as well. On the other hand, if the repeated diffractive features of the region are parallel to the short edge of the out-coupling diffractive optical element, then the intermediate optical element may be positioned along the short edge instead. There may be other configurations, depending on the desired form factor of the device to be manufactured.

The at least one intermediate optical element may comprise at least one of a diffractive optical element, such as a hologram or diffraction grating, and a reflective optical element, such as a mirror or prism. The at least one intermediate optical element may be configured as a waveguide for light from a respective one of the in-coupling diffractive optical elements to a region of a respective one of the out-coupling diffractive optical elements having the same spacing as the respective one of the in-coupling diffractive optical elements. Alternatively or additionally, the at least one intermediate optical element may be configured as a beam expander to expand light from a respective one of the in-coupling diffractive optical elements to a region of a respective one of the out-coupling diffractive optical elements having the same spacing as the respective one of the in-coupling diffractive optical elements.

According to various, but not necessarily all, embodiments of the invention there is also provided a monocular near-eye display comprising an apparatus as described above, a first optical projection engine and a second optical projection engine. The first optical projection engine is configured to project polychromatic light into the first and second in-coupling diffractive optical elements which are respectively configured to direct light to the first region of the first out-coupling diffractive optical element and to the second region of the second out-coupling diffractive optical element. The second optical projection engine is configured to project polychromatic light into the first and second in-coupling diffractive optical elements which are respectively configured to direct light to the first region of the second out-coupling diffractive optical element and to the second region of the first out-coupling diffractive optical element.

Any of the optical projection engines may typically comprise, for example, a display, such as a microdisplay, and a collimator.

According to various, but not necessarily all, embodiments of the invention there is also provided a binocular near-eye display comprising two apparatuses as described above, a first optical projection engine, a second optical projection engine and at least one additional optical projection engine. The first optical projection engine is configured to project polychromatic light into the first and second in-coupling diffractive optical elements which are respectively configured to direct light to the first region of the first out-coupling diffractive optical element and to the second region of the second out-coupling diffractive optical element of a first one of the two apparatuses. The second optical projection engine is configured to project polychromatic light into the first and second in-coupling diffractive optical elements which are respectively configured to direct light to the first region of the first out-coupling diffractive optical element and to the second region of the second out-coupling diffractive optical element of a second one of the two apparatuses. The at least one additional optical projection engine is configured to project polychromatic light into the first and second in-coupling diffractive optical elements which are respectively configured to direct light to the first region of the second out-coupling diffractive optical element and to the second region of the first out-coupling diffractive optical element of at least one of the two apparatuses.

Any of the optical projection engines may typically comprise, for example, a display, such as a microdisplay, and a collimator.

Preferably, each of the two apparatuses of the binocular near-eye display has a respective midpoint, and a separation between the midpoints of the two apparatuses is adjustable, to accommodate different interpupillary distances of different users.

Preferably, the at least one additional optical projection engine comprises a third optical projection engine and a fourth optical projection engine. The third optical projection engine is configured to project polychromatic light into the first and second in-coupling diffractive optical elements which are respectively configured to direct light to the first region of the second out-coupling diffractive optical element and to the second region of the first out-coupling diffractive optical element of the first one of the two apparatuses. The fourth optical projection engine is configured to project polychromatic light into the first and second in-coupling diffractive optical elements which are respectively configured to direct light to the first region of the second out-coupling diffractive optical element and to the second region of the first out-coupling diffractive optical element of the second one of the two apparatuses.

In an alternative possible preferred embodiment, the at least one additional optical projection engine is instead configured to project polychromatic light by temporal or spatial interlacing into the first and second in-coupling diffractive optical elements which are respectively configured to direct light to the first region of the second out-coupling diffractive optical element and to the second region of the first out-coupling diffractive optical element of both of the two apparatuses. Thus, for example, the at least one additional optical projection engine may project alternate frames of a video image sequence into said first and second in-coupling diffractive optical elements by temporal interlacing, or the at least one additional optical projection engine may project alternate lines of each frame of a video image sequence into said first and second in-coupling diffractive optical elements by spatial interlacing.

According to various, but not necessarily all, embodiments of the invention there is further provided a method comprising: emitting a first pattern of light of a first wavelength from a first region of a first out-coupling diffractive optical element and a second pattern of light of a second wavelength from a second region of the first out-coupling diffractive optical element adjacent to the first region; emitting light of the first wavelength in the second pattern from a first region of a second out-coupling diffractive optical element and light of the second wavelength in the first pattern from a second region of the second out-coupling diffractive optical element adjacent to the first region; superposing and aligning the first patterns of light emitted from the first region of the first out-coupling diffractive optical element and from the second region of the second out-coupling diffractive optical element; and superposing and aligning the second patterns of light emitted from the second region of the first out-coupling diffractive optical element and from the first region of the second out-coupling diffractive optical element.

Preferably, the first and second patterns of light may typically be spatially continuous with each other, so that together they combine to form a single pattern, such as a single still image or a single frame of a video sequence.

Preferably, the method further comprises projecting polychromatic light with the first pattern into one of a first pair of in-coupling diffractive optical elements with a first repeated diffraction spacing corresponding to the first wavelength and into one of a second pair of in-coupling diffractive optical elements with a second repeated diffraction spacing corresponding to the second wavelength; projecting polychromatic light with the second pattern into the other of the first pair of in-coupling diffractive optical elements with the first repeated diffraction spacing and into the other of the second pair of in-coupling diffractive optical elements with the second repeated diffraction spacing; transmitting the first pattern of light from said one of the first pair of in-coupling diffractive optical elements to the first region of the first out-coupling diffractive optical element and from said one of the second pair of in-coupling diffractive optical elements to the second region of the second out-coupling diffractive optical element; and transmitting the second pattern of light from said other of the first pair of in-coupling diffractive optical elements to the first region of the second out-coupling diffractive optical element and from said other of the second pair of in-coupling diffractive optical elements to the second region of the first out-coupling diffractive optical element.

BRIEF DESCRIPTION

For a better understanding of various examples that are useful for understanding the detailed description, reference will now be made by way of example only to the accompanying drawings in which:

FIG. 1A is a first schematic view showing a longitudinal cross-section through an out-coupling diffractive optical element;

FIG. 1B is a second schematic view showing a longitudinal cross-section through the out-coupling diffractive optical element of FIG. 1A;

FIG. 1C is a schematic view showing a longitudinal cross-section through an apparatus comprising an in-coupling diffractive optical element and a pair of out-coupling diffractive optical elements as seen by a viewer;

FIG. 2A is a schematic plan view of two components of a first apparatus for out-coupling polychromatic light;

FIG. 2B is a schematic plan view of the two components of FIG. 2A superposed one on top of the other;

FIG. 5C is a second schematic view showing a longitudinal cross-section through the monocular near-eye display of FIG. 5A;

FIG. 6A is a schematic plan view of a second monocular near-eye display in a first configuration;

FIG. 6B is a schematic view showing a longitudinal cross-section through the monocular near-eye display of FIG. 6A in the first configuration;

DETAILED DESCRIPTION

Figure 3A:
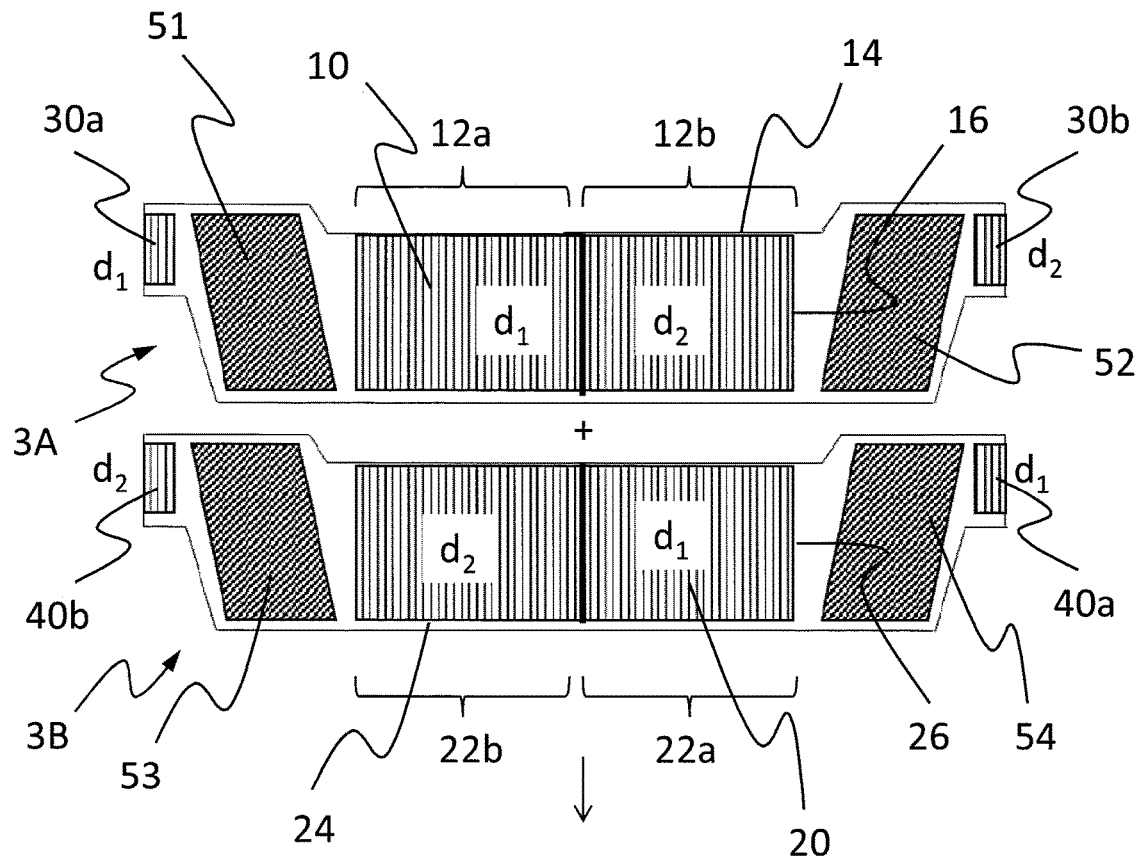
FIG. 3A is a schematic plan view of two components of a second apparatus for out-coupling polychromatic light.

FIG. 3A shows two components 3A, 3B of an apparatus 3 for out-coupling polychromatic light. The component 3A comprises a first out-coupling diffractive optical element 10, a first in-coupling diffractive optical element 30a, a second in-coupling diffractive optical element 30b, and two intermediate optical elements 51, 52. The first out-coupling diffractive optical element 10 comprises a first region 12a having a first repeated diffraction spacing, $d_1$, and a second region 12b adjacent to the first region 12a and having a second repeated diffraction spacing, $d_2$, which is different from the first spacing, $d_1$. The first in-coupling diffractive optical element 30a also has the first repeated diffraction spacing, $d_1$, and is configured to direct light to the first region 12a. The second in-coupling diffractive optical element 30b instead has the second repeated diffraction spacing, $d_2$, and is configured to direct light to the second region 12b. The two intermediate optical elements 51, 52 are respectively configured to transmit light from the first in-coupling diffractive optical element 30a to the first region 12a and from the second in-coupling diffractive optical element 30b to the second region 12b.

The component 3B comprises a second out-coupling diffractive optical element 20, another first in-coupling diffractive optical element 40a, another second in-coupling diffractive optical element 40b, and two further intermediate optical elements 53, 54. The second out-coupling diffractive optical element 20 comprises a first region 22a having the first repeated diffraction spacing, $d_1$, and a second region 22b adjacent to the first region 22a and having the second repeated diffraction spacing, $d_2$. The first in-coupling diffractive optical element 40a also has the first repeated diffraction spacing, $d_1$, and is configured to direct light to the first region 22a. The second in-coupling diffractive optical element 40b instead has the second repeated diffraction spacing, $d_2$, and is configured to direct light to the second region 22b. The two intermediate optical elements 53, 54 are respectively configured to transmit light from the first in-coupling diffractive optical element 40a to the first region 22a and from the second in-coupling diffractive optical element 40b to the second region 22b.

The first and second out-coupling diffractive optical elements 10, 20 are both substantially rectangular and have respective long edges 14, 24 and short edges 16, 26. A division between the first region 12a, 22a and the second region 12b, 22b of the first and second out-coupling diffractive optical elements 10, 20 is located substantially equidistant between the pair of short edges. In this embodiment, the first and second out-coupling diffractive optical elements 10, 20 are both diffraction gratings. The first region 12a, 22a of each grating comprises rulings of the first spacing, $d_1$, and the second region 12b, 22b of each grating comprises rulings of the second spacing, $d_2$. The rulings of the first region of each grating are substantially parallel to the rulings of the second region of the same grating and are aligned substantially parallel with the short edges 16, 26 of the out-coupling diffractive optical elements 10, 20. All of the intermediate optical elements 51, 52; 53, 54 are positioned along the short edges 16, 26 of the respective ones 10, 20 of the out-coupling diffractive optical elements.

Figure 3B:
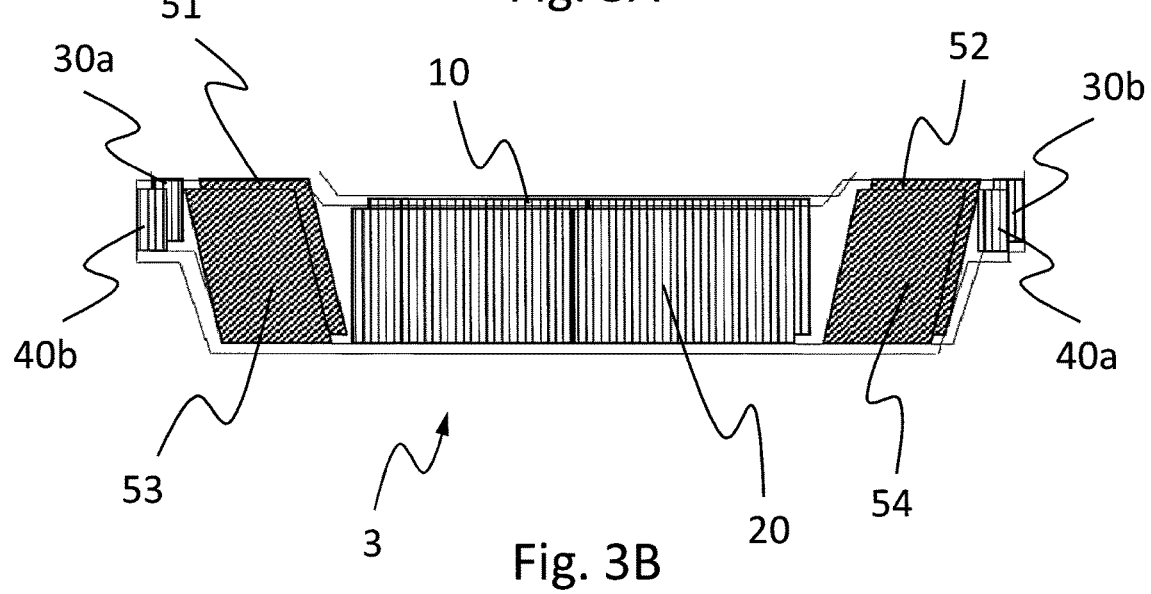
FIG. 3B is a schematic plan view of the two components of FIG. 3A superposed one on top of the other.

FIG. 3B shows the two components 3A, 3B of FIG. 3A superposed one on top of the other in apparatus 3. The first region 12a of the first out-coupling diffractive optical element 10 is carefully aligned with the second region 22b of the second out-coupling diffractive optical element 20, and the second region 12b of the first out-coupling diffractive optical element 10 is carefully aligned with the first region 22a of the second out-coupling diffractive optical element 20. Thus, if a first pattern of polychromatic light is projected into the left first and second in-coupling diffractive optical elements 30a, 40b, the first pattern of light of a first wavelength equal to the first spacing $d_1$ will be transmitted from the first in-coupling diffractive optical element 30a by the intermediate optical element 51 to the first region 12a of the first out-coupling diffractive optical element 10, and the first pattern of light of a second wavelength equal to the second spacing $d_2$ will be transmitted from the second in-coupling diffractive optical element 40b by the intermediate optical element 53 to the second region 22b of the second out-coupling diffractive optical element 20. Thereafter, the first pattern of light of the first wavelength will be emitted from the first region 12a of the first out-coupling diffractive optical element 10, and the first pattern of light of the second wavelength will be emitted from the second region 22b of the second out-coupling diffractive optical element 20. Due to the aforementioned careful alignment of the optical elements, the first pattern of light of the first wavelength emitted from the first region 12a and the first pattern of light of the second wavelength emitted from the second region 22b will therefore also be superposed and aligned with each other, and will recombine to recreate the first pattern of polychromatic light on a left-hand side of a combined field of view of the out-coupling diffractive optical elements 10, 20.

Meanwhile, if a second pattern of polychromatic light is projected into the right first and second in-coupling diffractive optical elements 40a, 30b, the second pattern of light of the first wavelength will be transmitted from the first in-coupling diffractive optical element 40a by the intermediate optical element 54 to the first region 22a of the second out-coupling diffractive optical element 20, and the second pattern of light of the second wavelength will be transmitted from the second in-coupling diffractive optical element 30b by the intermediate optical element 52 to the second region 12b of the first out-coupling diffractive optical element 10. Thereafter, the second pattern of light of the first wavelength will be emitted from the first region 22a of the second out-coupling diffractive optical element 20, and the second pattern of light of the second wavelength will be emitted from the second region 12b of the first out-coupling diffractive optical element 10. Once again, due to the aforementioned careful alignment of the optical elements, the second pattern of light of the first wavelength emitted from the first region 22a and the second pattern of light of the second wavelength emitted from the second region 12b will also be superposed and aligned with each other, and will recombine to recreate the second pattern of polychromatic light on a right-hand side of the combined field of view of the out-coupling diffractive optical elements 10, 20.

If the first pattern of polychromatic light on the left-hand side of the combined field of view is continuous with the second pattern of polychromatic light on the right-hand side of the combined field of view, the first and second patterns of polychromatic light will combine to create a single pattern of polychromatic light in a field of view which is both wider and brighter than in a conventional arrangement, such as that shown and described above in relation to FIGS. 2A and 2B, for example. In order to achieve this, the first and second patterns of polychromatic light do not have to be distinct left and right halves of one image or sequence of images, with a sharp boundary between the two halves. Instead, the first and second patterns of polychromatic light may just be two copies of the same image or sequence of images. If so, the first pattern will fade out from left to right during its passage through the apparatus 3 and the second pattern will fade out from right to left by a similar amount during its passage through the apparatus 3, so that when the two patterns are recombined as just described, they can form a single pattern of uniform brightness, with little or no vignetting.

The apparatus 3 shown in FIG. 3B is suitable for use in a monocular near-eye display, if combined with a first optical projection engine configured to project polychromatic light into the left first and second in-coupling diffractive optical elements 30a, 40b, and with a second optical projection engine configured to project polychromatic light into the right first and second in-coupling diffractive optical elements 40a, 30b. Two copies of the apparatus 3 shown in FIG. 3B arranged side by side with each other along their short edges would also be suitable for use in a binocular near-eye display, one for each eye, if combined with at least three optical projection engines, as follows. A first optical projection engine configured to project polychromatic light into the left first and second in-coupling diffractive optical elements 30a, 40b of a first one of the two apparatuses, a second optical projection engine configured to project polychromatic light into the right first and second in-coupling diffractive optical elements 40a, 30b of a second one of the two apparatuses, and at least one additional optical projection engine configured to project polychromatic light into the remaining in-coupling diffractive optical elements of the two apparatuses.

Figures 4A, 4B:
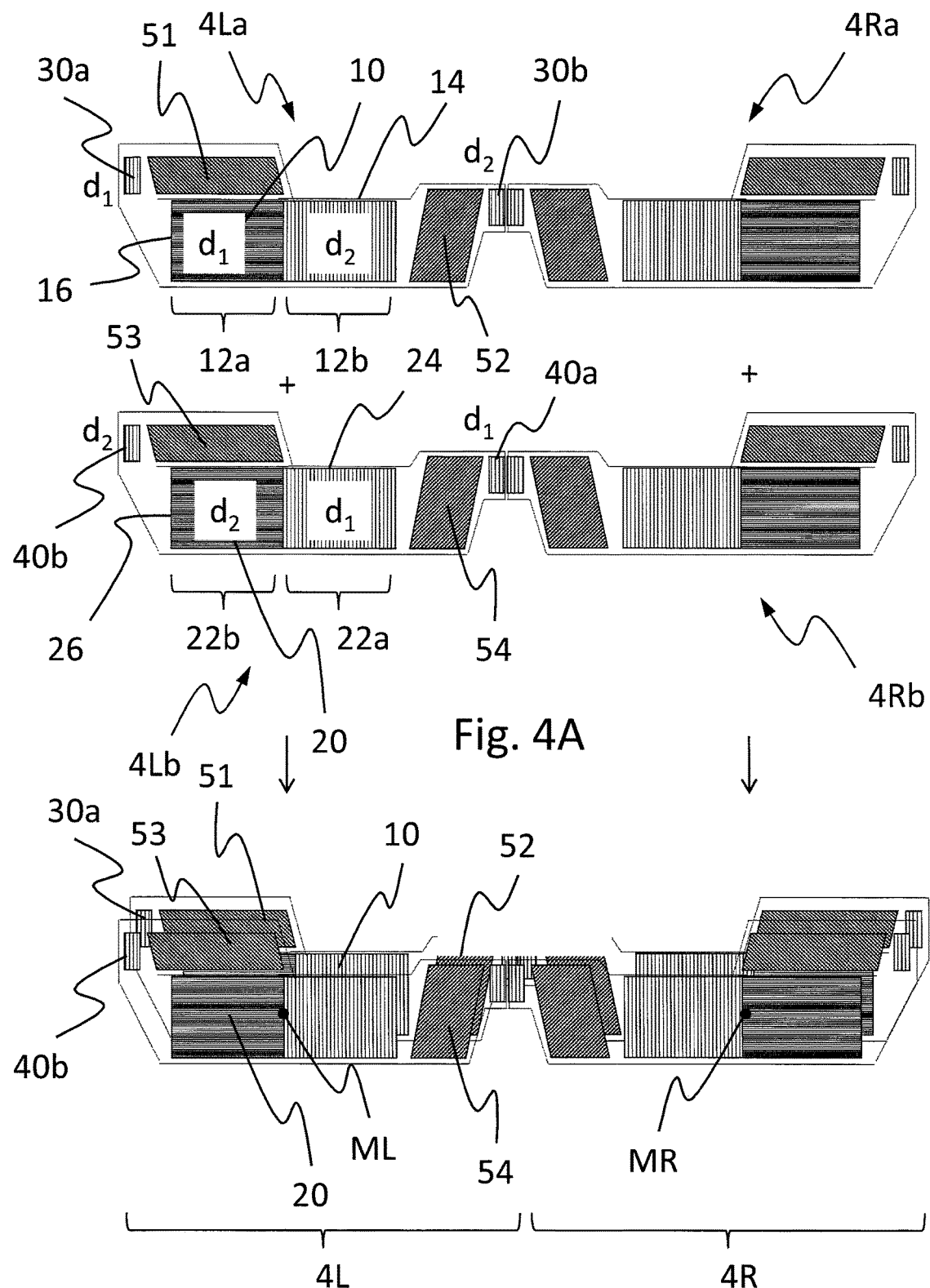
FIG. 4A is a schematic plan view of two components of each of a third and a fourth apparatus for out-coupling polychromatic light.
FIG. 4B is a schematic plan view of the two components of each of the third and fourth apparatuses of FIG. 4A superposed one on top of the other.

FIG. 4A shows on the left-hand side thereof, two components 4La, 4Lb of a first apparatus 4L, and on the right-hand side thereof, two components 4Ra, 4Rb of a second apparatus 4R, both of which apparatuses are for out-coupling polychromatic light. The two apparatuses 4L, 4R are mirror images of each other, so for the sake of concision, only the left-hand, apparatus 4L will be described below, and the structure and function of the right-hand apparatus 4R can be readily and clearly understood from the same description. The two apparatuses 4L, 4R are suitable for use together with each other in a binocular near-eye display, one for each eye, if combined with suitable optical projection engines, as will be described further below.

The component 4La comprises a first out-coupling diffractive optical element 10, a first in-coupling diffractive optical element 30a, a second in-coupling diffractive optical element 30b, and two intermediate optical elements 51, 52. The first out-coupling diffractive optical element 10 comprises a first region 12a having a first repeated diffraction spacing, $d_1$, and a second region 12b adjacent to the first region 12a and having a second repeated diffraction spacing, $d_2$, which is different from the first spacing, $d_1$. The first in-coupling diffractive optical element 30a also has the first repeated diffraction spacing, $d_1$, and is configured to direct light to the first region 12a. The second in-coupling diffractive optical element 30b instead has the second repeated diffraction spacing, $d_2$, and is configured to direct light to the second region 12b. The two intermediate optical elements 51, 52 are respectively configured to transmit light from the first in-coupling diffractive optical element 30a to the first region 12a and from the second in-coupling diffractive optical element 30b to the second region 12b.

The component 4Lb comprises a second out-coupling diffractive optical element 20, another first in-coupling diffractive optical element 40a, another second in-coupling diffractive optical element 40b, and two further intermediate optical elements 53, 54. The second out-coupling diffractive optical element 20 comprises a first region 22a having the first repeated diffraction spacing, $d_1$, and a second region 22b adjacent to the first region 22a and having the second repeated diffraction spacing, $d_2$. The first in-coupling diffractive optical element 40a also has the first repeated diffraction spacing, $d_1$, and is configured to direct light to the first region 22a. The second in-coupling diffractive optical element 40b instead has the second repeated diffraction spacing, $d_2$, and is configured to direct light to the second region 22b. The two intermediate optical elements 53, 54 are respectively configured to transmit light from the first in-coupling diffractive optical element 40a to the first region 22a and from the second in-coupling diffractive optical element 40b to the second region 22b.

The first and second out-coupling diffractive optical elements 10, 20 are both substantially rectangular and have respective long edges 14, 24 and short edges 16, 26. A division between the first region 12a, 22a and the second region 12b, 22b of the first and second out-coupling diffractive optical elements 10, 20 is located substantially equidistant between the pair of short edges. In this embodiment, the first and second out-coupling diffractive optical elements 10, 20 are both diffraction gratings. The first region 12a, 22a of each grating comprises rulings of the first spacing, $d_1$, and the second region 12b, 22b of each grating comprises rulings of the second spacing, $d_2$. In contrast to the embodiment shown and described above in relation to FIGS. 3A and 3B, the rulings of the first region 12a, 22a of each grating are substantially perpendicular to the rulings of the second region 12b, 22b of the same grating. In addition, the rulings of the first region 12a of the first grating 10 and the rulings of the second region 22b of the second grating 20 are aligned substantially perpendicular with the short edges 16, 26 of the out-coupling diffractive optical elements 10, 20. Because of this different configuration of the first region 12a of the first grating 10 and of the second region 22b of the second grating 20, in contrast to the embodiment shown in FIGS. 3A and 3B, their respective intermediate optical elements 51, 53 are instead positioned along the long edges 14, 24 of the respective ones 10, 20 of the out-coupling diffractive optical elements. On the other hand, the other intermediate optical elements 52, 54 are still positioned along the short edges 16, 26 of the respective ones 10, 20 of the out-coupling diffractive optical elements, as in the embodiment shown in FIGS. 3A and 3B. This different arrangement of the intermediate optical elements 51, 53 allows light to be directed into each grating 10, 20 from directions which are perpendicular to each other, giving greater design freedom to adapt to ergonomic requirements.

FIG. 4B shows on the left-hand side thereof, the two components 4La, 4Lb of FIG. 4A superposed one on top of the other in apparatus 4L, and on the right-hand side thereof, the two components 4Ra, 4Rb of FIG. 4A superposed one on top of the other in apparatus 4R. As with FIG. 4A, since the two apparatuses 4L, 4R are mirror images of each other, for the sake of concision, only the left-hand apparatus 4L will be described below, and the structure and function of the right-hand apparatus 4R can be readily and clearly understood from the same description. In the apparatus 4L, the first region 12a of the first out-coupling diffractive optical element 10 is carefully aligned with the second region 22b of the second out-coupling diffractive optical element 20, and the second region 12b of the first out-coupling diffractive optical element 10 is carefully aligned with the first region 22a of the second out-coupling diffractive optical element 20. The apparatus 4L is therefore able to function in a similar manner to the apparatus 3 described above in relation to FIG. 3B. Thus, if a first pattern of polychromatic light is projected into the left first and second in-coupling diffractive optical elements 30a, 40b, and if a second pattern of polychromatic light is projected into the right first and second in-coupling diffractive optical elements 40a, 30b, the first pattern of polychromatic light will be recreated on a left-hand side of a combined field of view of the out-coupling diffractive optical elements 10, 20 and the second pattern of polychromatic light will be recreated on a right-hand side of the combined field of view of the out-coupling diffractive optical elements 10, 20. If the first pattern of polychromatic light on the left-hand side of the combined field of view is continuous with the second pattern of polychromatic light on the right-hand side of the combined field of view, the first and second patterns of polychromatic light will combine to create a single pattern of light in a field of view which is both wider and brighter than in a conventional arrangement, in a similar manner to that described above in relation to FIG. 3B, with the same technical results and advantages as already described above.

As mentioned above, the two apparatuses 4L, 4R are suitable for use together with each other in a binocular near-eye display, one for each eye, if combined with suitable optical projection engines. If so, these optical projection engines should include a first optical projection engine configured to project polychromatic light into the left first and second in-coupling diffractive optical elements 30a, 40b of the left-hand one 4L of the two apparatuses, a second optical projection engine configured to project polychromatic light into the right first and second in-coupling diffractive optical elements 30a, 40b of the right-hand one 4R of the two apparatuses, and at least one additional optical projection engine configured to project polychromatic light into the other in-coupling diffractive optical elements 40a, 30b of both apparatuses 4L, 4R.

Figures 7A, 7B:
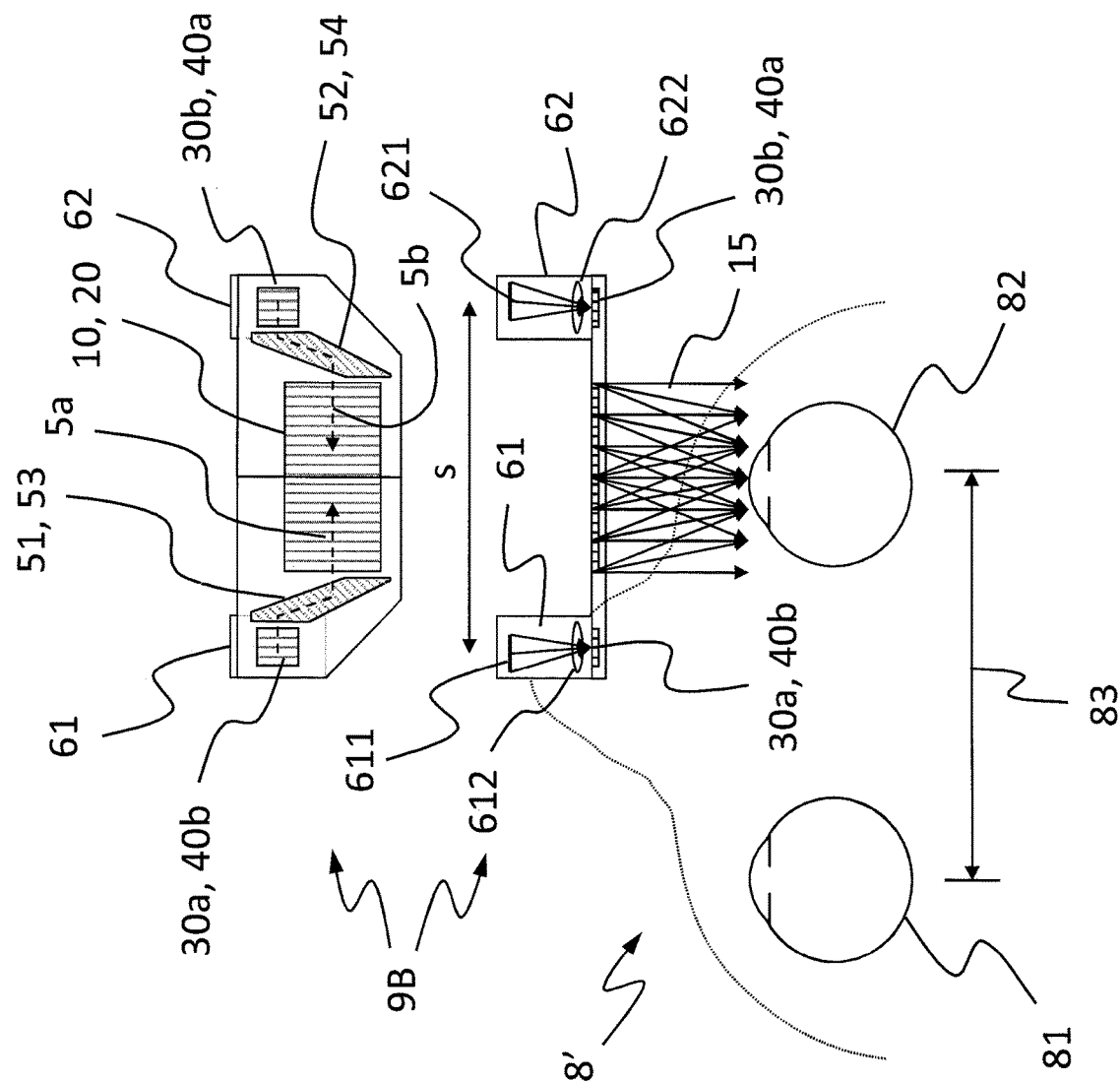
FIG. 7A is a schematic plan view of the second monocular near-eye display of FIGS. 6A and 6B in a second configuration.
FIG. 7B is a schematic view showing a longitudinal cross-section through the monocular near-eye display of FIGS. 6A to 7A in the second configuration.

Each of the two apparatuses 4L, 4R has a respective midpoint ML, MR, a shown in FIG. 4B. If the two apparatuses 4L, 4R are combined with optical projection engines in a binocular near-eye display as just described, a separation between these two midpoints ML, MR may also be made adjustable, in order to accommodate different interpupillary distances 83 (see. FIG. 7B) of different users.

In a first possible alternative embodiment, the at least one additional optical projection engine may comprise a third optical projection engine configured to project polychromatic light into the first and second in-coupling diffractive optical elements 40a, 30b of the left-hand apparatus 4L, and a fourth optical projection engine configured to project polychromatic light into the first and second in-coupling diffractive optical elements 40a, 30b of the right-hand apparatus 4R. However, in a second possible alternative embodiment, the at least one additional optical projection engine may instead be configured to project polychromatic light by temporal or spatial interlacing into the first and second in-coupling diffractive optical elements 40a, 30b of both of the two apparatuses 4L, 4R. For example, the at least one additional optical projection engine may project alternate frames of a video image sequence into the first and second in-coupling diffractive optical elements 40a, 30b of both of the two apparatuses 4L, 4R by temporal interlacing, or the at least one additional optical projection engine may project alternate lines of each frame of a video image sequence into the first and second in-coupling diffractive optical elements 40a, 30b of both of the two apparatuses 4L, 4R by spatial interlacing.

Figures 5A, 5B:
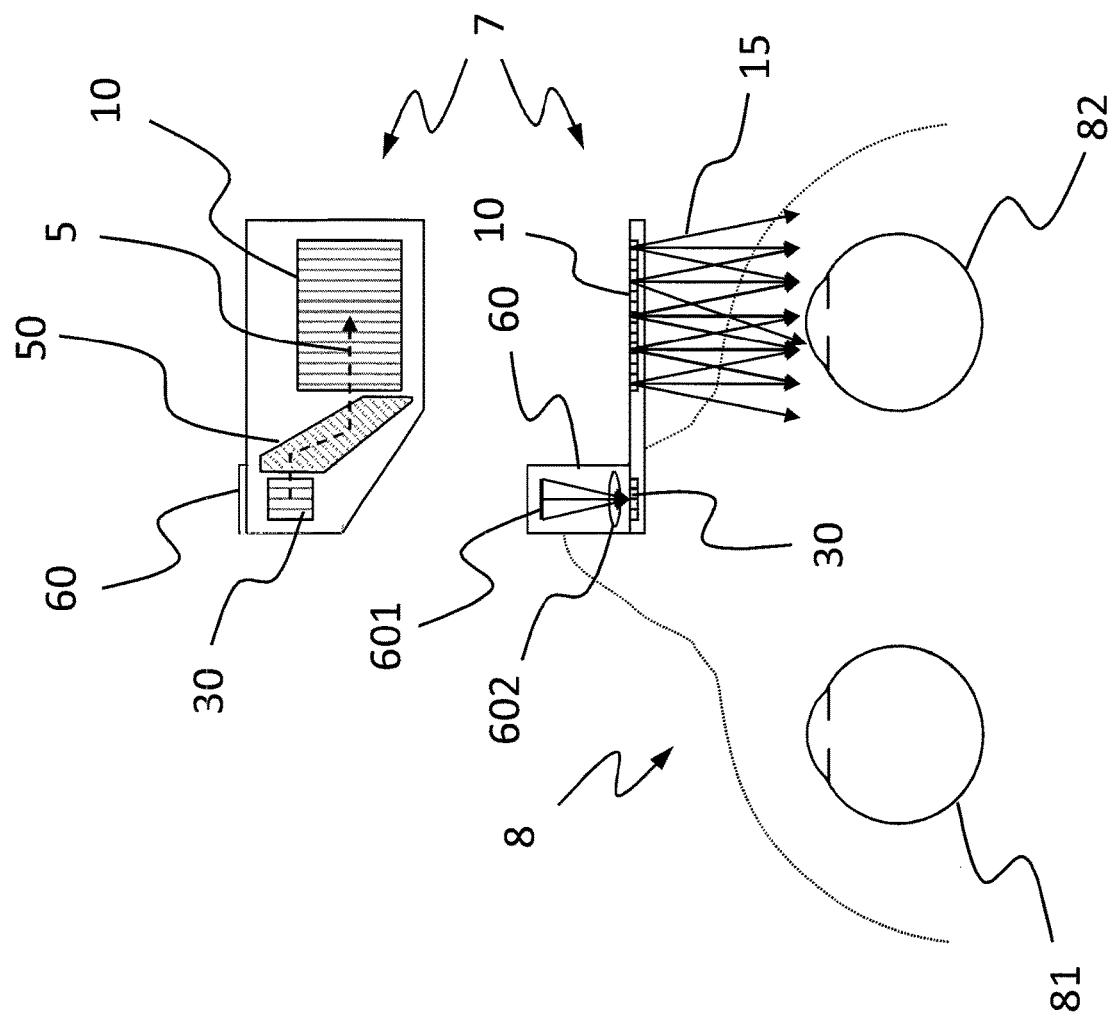
FIG. 5A is a schematic plan view of a first monocular near-eye display.
FIG. 5B is a first schematic view showing a longitudinal cross-section through the monocular near-eye display of FIG. 5A.

FIGS. 5A and 5B respectively schematically show plan and cross-sectional views of a first monocular near-eye display 7 in relation to a viewer 8 having eyeballs 81, 82. The monocular near-eye display 7 comprises an optical projection engine 60, an in-coupling diffractive optical element 30, an intermediate optical element 50, and an out-coupling diffractive optical element 10. The optical projection engine 60 comprises a microdisplay 601 and a collimator 602. The out-coupling diffractive optical element 10 comprises a diffractive layer having a repeated diffraction spacing, d. Light 5 from the microdisplay 601 is projected by the collimator 602 into the in-coupling diffractive optical element 30 and is transmitted from there by the intermediate optical element 50 to the out-coupling diffractive optical element 10. The light 5 is transmitted through the interior of the diffractive optical element 10 by total internal reflection and is diffracted by the diffractive layer thereof. When diffracted, the light 5 is out-coupled from the diffractive optical element 10, as represented by arrows 15. Since the out-coupling diffractive optical element 10 is of a conventional design, similar to that shown and described above in relation to FIGS. 2A and 2B, some of the out-coupled light 15 is wasted by falling in regions indicated in FIG. 5C by the letter C, outside the entrance pupil of eye 82.

In contrast, FIGS. 6A and 6B respectively schematically show plan and cross-sectional views of a second monocular near-eye display 9A in relation to a viewer 8 having eyeballs 81, 82.

The monocular near-eye display 9A comprises two optical projection engines 61, 62, each of which respectively comprises a microdisplay 611, 621 and a collimator 612, 622. The monocular near-eye display 9A further comprises an apparatus 3, as described above in relation to FIG. 3B. The apparatus 3 therefore comprises two pairs of superposed and aligned in-coupling diffractive optical elements 30a, 40b and 30b, 40a, four intermediate optical elements 51, 52, 53, 54, and two superposed and aligned out-coupling diffractive optical elements 10, 20. The out-coupling diffractive optical elements 10, 20 each respectively comprise a first region 12a, 22a and a second region 12b, 22b, with properties as already described above in relation to FIG. 3B. Thus a first pattern of polychromatic light 5a projected by a first one 61 of the two optical projection engines into the in-coupling diffractive optical elements 30a, 40b and a second pattern of polychromatic light 5b projected by a second one 62 of the two optical projection engines into the in-coupling diffractive optical elements 30b, 40a are combined with each other by the two superposed and aligned out-coupling diffractive optical elements 10, 20 to create a single pattern of polychromatic light 15 in a field of view which is both wider and brighter than in a conventional arrangement, such as that shown and described above in relation to FIGS. 5A to 5C. When the two patterns 5a, 5b are thus recombined, they can therefore form a single pattern of uniform brightness, with little or no vignetting.

FIGS. 7A and 7B respectively schematically show plan and cross-sectional views of a third monocular near-eye display 9B, wherein the length of the long edges of the first and second out-coupling diffractive optical elements 10, 20 is less than that of the long edges of the first and second out-coupling diffractive optical elements 10, 20 in the second monocular near-eye display 9A, whereas a length of the short edges of the first and second out-coupling diffractive optical elements 10, 20 remains the same. In other words, an aspect ratio of the first and second out-coupling diffractive optical elements 10, 20 in the third monocular near-eye display 9B is less than that of the first and second out-coupling diffractive optical elements 10, 20 in the second monocular near-eye display 9A. A separation, s, of the two optical projection engines 61, 62 has also been correspondingly reduced, in comparison to their respective dispositions as shown in FIGS. 6A and 6B. On the other hand, the division between the first and second regions of the first and second out-coupling diffractive optical elements 10, 20 has been maintained substantially equidistant between the short edges of elements 10, 20. Thus, as may be seen in FIG. 7B, the eye of a viewer 8' of the first and second out-coupling diffractive optical elements 10, 20 remains positioned substantially perpendicular to this division, for equal viewing of the first and second regions. On the other hand, as may be seen by comparing the spread of the arrows 15 representing out-coupled light in FIG. 7B with that of the arrows 15 in FIG. 6B, more of the out-coupled light enters the eye 82 of the viewer 8' in FIG. 7B than enters the eye of the viewer 8 in FIG. 6B, and less of the out-coupled light is wasted. The viewer 8' therefore experiences an image of improved brightness.

In all of the accompanying drawings, including FIGS. 5A, 6A and 7A, it should be noted that the orientation of the hatching on the intermediate optical elements 50, 51, 52, 53, 54 does not necessarily represent the orientation of any repeated diffractive features of the intermediate optical elements 50, 51, 52, 53, 54.

Figure 8:
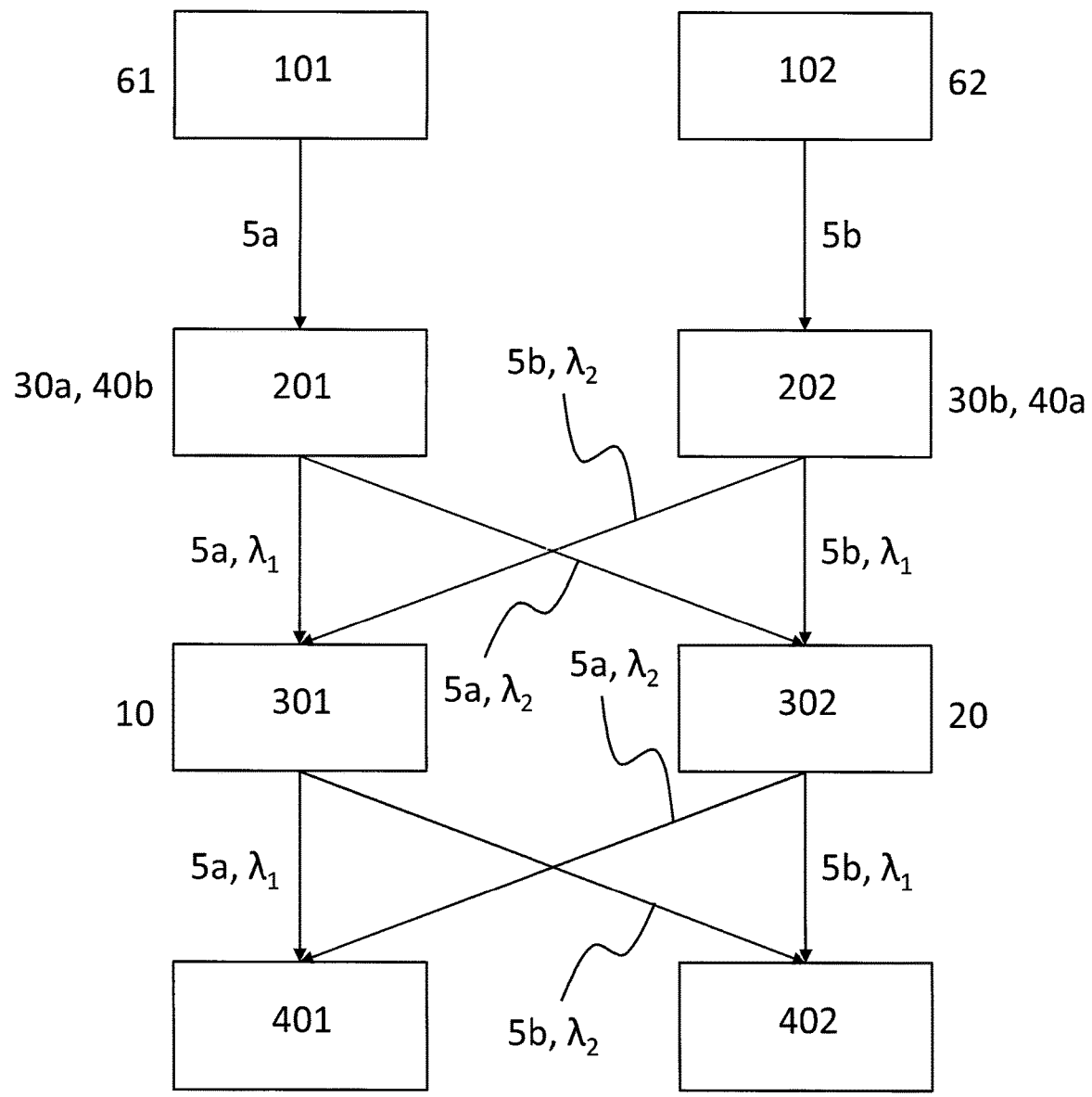
FIG. 8 is a flow diagram schematically representing a method of out-coupling polychromatic light.

Finally, FIG. 8 schematically represents a method of out-coupling polychromatic light. In box 101, polychromatic light with a first pattern 5a is projected into one 30a of a first pair of in-coupling diffractive optical elements with a first repeated diffraction spacing corresponding to a first wavelength and into one 40b of a second pair of in-coupling diffractive optical elements with a second repeated diffraction spacing corresponding to a second wavelength. Meanwhile, in box 102, polychromatic light with a second pattern 5b is projected into the other 40a of the first pair of in-coupling diffractive optical elements with the first repeated diffraction spacing and into the other 30b of the second pair of in-coupling diffractive optical elements with the second repeated diffraction spacing.

In box 201, the first pattern of light 5a is transmitted from said one 30a of the first pair of in-coupling diffractive optical elements to the first region 12a of the first out-coupling diffractive optical element 10 and from said one 40b of the second pair of in-coupling diffractive optical elements to the second region 22b of the second out-coupling diffractive optical element 20. Meanwhile, in box 202, the second pattern of light is transmitted from said other 40a of the first pair of in-coupling diffractive optical elements to the first region 22a of the second out-coupling diffractive optical element 20 and from said other 30b of the second pair of in-coupling diffractive optical elements to the second region 12b of the first out-coupling diffractive optical element 10.

In box 301, the first pattern of light 5a of the first wavelength $\lambda_1$ is emitted from the first region 12a of the first out-coupling diffractive optical element 10 and the second pattern of light 5b of the second wavelength $\lambda_2$ is emitted from the second region 12b of the first out-coupling diffractive optical element 10 adjacent to the first region 12a. Meanwhile, in box 302, light of the first wavelength $\lambda_1$ in the second pattern 5b is emitted from the first region 22a of the second out-coupling diffractive optical element 20 and light of the second wavelength $\lambda_2$ in the first pattern is emitted from a second region 22b of the second out-coupling diffractive optical element 20 adjacent to the first region.

In box 401, the first patterns of light emitted from the first region 12a of the first out-coupling diffractive optical element 10 and from the second region 22b of the second out-coupling diffractive optical element 20 are superposed and aligned with each other. Meanwhile, in box 402, the second patterns of light emitted from the second region 12b of the first out-coupling diffractive optical element 10 and from the first region 22a of the second out-coupling diffractive optical element 20 are also superposed and aligned with each other. If the first and second patterns of light are spatially continuous with each other, they can combine to form a single pattern, such as a single still image or a single frame of a video sequence, in a field of view which is both wider and brighter than if just one of the first and second patterns were present. Whereas boxes 301, 302, 401 and 402 are essential features of this method, boxes 101, 102, 201 and 202 are only preferred features.

The term 'comprise' is used in this document with an inclusive not an exclusive meaning. That is any reference to X comprising Y indicates that X may comprise only one Y or may comprise more than one Y. If it is intended to use 'comprise' with an exclusive meaning then it will be made clear in the context by referring to 'comprising only one' or by using 'consisting'.

In this brief description, reference has been made to various examples. The description of features or functions in relation to an example indicates that those features or functions are present in that example. The use of the term 'example' or 'for example' or 'may' in the text denotes, whether explicitly stated or not, that such features or functions are present in at least the described example, whether described as an example or not, and that they can be, but are not necessarily, present in some of or all other examples. Thus 'example', 'for example' or 'may' refers to a particular instance in a class of examples. A property of the instance can be a property of only that instance or a property of the class or a property of a sub-class of the class that includes some but not all of the instances in the class. It is therefore implicitly disclosed that a feature described with reference to one example but not with reference to another example, can where possible be used in that other example but does not necessarily have to be used in that other example.

Although embodiments of the present invention have been described in the preceding paragraphs with reference to various examples, it should be appreciated that modifications to the examples given can be made without departing from the scope of the invention as claimed.

Features described in the preceding description may be used in combinations other than the combinations explicitly described.

Although functions have been described with reference to certain features, those functions may be performable by other features whether described or not.

Although features have been described with reference to certain embodiments, those features may also be present in other embodiments whether described or not.

Whilst endeavouring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

The invention claimed is:

1. An apparatus comprising:
a first out-coupling diffractive optical element and a second out-coupling diffractive optical element, wherein each of the first and second out-coupling diffractive optical elements comprises:
a first region having a first repeated diffraction spacing, d1, and
a second region adjacent to the first region and having a second repeated diffraction spacing, d2, different from the first spacing, d1;
wherein the first region of the first out-coupling diffractive optical element is superposed on and aligned with the second region of the second out-coupling diffractive optical element; and
the second region of the first out-coupling diffractive optical element is superposed on and aligned with the first region of the second out-coupling diffractive optical element.

2. An apparatus according to claim 1, wherein the first and second out-coupling diffractive optical elements are both substantially rectangular and have a pair of long edges and a pair of short edges, and a division between the first region and the second region of the first and second out-coupling diffractive optical elements is located substantially equidistant between the pair of short edges.

3. An apparatus according to claim 1, wherein the first and second out-coupling diffractive optical elements are both diffraction gratings, wherein the first region of each grating comprises rulings of the first spacing, d1, the second region of each grating comprises rulings of the second spacing, d2, and the rulings of the first region of each grating are substantially parallel to the rulings of the second region of the same grating.

4. An apparatus according to claim 1, wherein the first and second out-coupling diffractive optical elements are both diffraction gratings, wherein the first region of each grating comprises rulings of the first spacing, d1, the second region of each grating comprises rulings of the second spacing, d2, and the rulings of the first region of each grating are substantially perpendicular to the rulings of the second region of the same grating.

5. An apparatus according to claim 1, further comprising:
a first pair of in-coupling diffractive optical element having the first repeated diffraction spacing, d1, and configured to direct light to the first region of respective ones of the first and second out-coupling diffractive optical elements; and
a second pair of in-coupling diffractive optical element having the second repeated diffraction spacing, d2, and configured to direct light to the second region of respective ones of the first and second out-coupling diffractive optical elements.

6. An apparatus according to claim 5, further comprising at least one intermediate optical element configured to transmit light from a respective one of the in-coupling diffractive optical elements to a region of a respective one of the out-coupling diffractive optical elements having the same spacing as the respective one of the in-coupling diffractive optical elements.

7. An apparatus according to claim 6, further comprising:
at least one intermediate optical element configured to transmit light from a respective one of the in-coupling diffractive optical elements to a region of a respective one of the out-coupling diffractive optical elements having the same spacing as the respective one of the in-coupling diffractive optical elements, wherein the first and second out-coupling diffractive optical elements are both substantially rectangular and have a pair of long edges and a pair of short edges, and a division between the first region and the second region of the first and second out-coupling diffractive optical elements is located substantially equidistant between the pair of short edges, wherein the first and second out-coupling diffractive optical elements are both diffraction gratings, wherein the first region of each grating comprises rulings of the first spacing, d1, the second region of each grating comprises rulings of the second spacing, d2, and the rulings of the first region of each grating are substantially parallel to the rulings of the second region of the same grating, wherein the intermediate optical element is positioned along one of the short edges of the respective one of the out-coupling diffractive optical elements.

8. An apparatus according to claim 6, further comprising:
at least one intermediate optical element configured to transmit light from a respective one of the in-coupling diffractive optical elements to a region of a respective one of the out-coupling diffractive optical elements having the same spacing as the respective one of the in-coupling diffractive optical elements, wherein the first and second out-coupling diffractive optical elements are both substantially rectangular and have a pair of long edges and a pair of short edges, and a division between the first region and the second region of the first and second out-coupling diffractive optical elements is located substantially equidistant between the pair of short edges, wherein the first and second out-coupling diffractive optical elements are both diffraction gratings, wherein the first region of each grating comprises rulings of the first spacing, d1, the second region of each grating comprises rulings of the second spacing, d2, and the rulings of the first region of each grating are substantially perpendicular to the rulings of the second region of the same grating, wherein the intermediate optical element is positioned along one of the long edges of the respective one of the out-coupling diffractive optical elements.

9. A monocular near-eye display comprising:
an apparatus according to claim 5;
a first optical projection engine configured to project polychromatic light into the first and second in-coupling diffractive optical elements which are respectively configured to direct light to the first region of the first out-coupling diffractive optical element and to the second region of the second out-coupling diffractive optical element; and
a second optical projection engine configured to project polychromatic light into the first and second in-coupling diffractive optical elements which are respectively configured to direct light to the first region of the second out-coupling diffractive optical element and to the second region of the first out-coupling diffractive optical element.

10. A binocular near-eye display comprising:
two apparatuses according to claim 5;
a first optical projection engine configured to project polychromatic light into the first and second in-coupling diffractive optical elements which are respectively configured to direct light to the first region of the first out-coupling diffractive optical element and to the second region of the second out-coupling diffractive optical element of a first one of the two apparatuses;

a second optical projection engine configured to project polychromatic light into the first and second in-coupling diffractive optical elements which are respectively configured to direct light to the first region of the first out-coupling diffractive optical element and to the second region of the second out-coupling diffractive optical element of a second one of the two apparatuses; and at least one additional optical projection engine configured to project polychromatic light into the first and second in-coupling diffractive optical elements which are respectively configured to direct light to the first region of the second out-coupling diffractive optical element and to the second region of the first out-coupling diffractive optical element of at least one of the two apparatuses.

11. A binocular near-eye display according to claim 10, wherein each of the two apparatuses has a respective midpoint, and a separation between the midpoints of the two apparatuses is adjustable, to accommodate different interpupillary distances of different users.

12. A binocular near-eye display according to claim 10, wherein the at least one additional optical projection engine comprises:
a third optical projection engine configured to project polychromatic light into the first and second in-coupling diffractive optical elements which are respectively configured to direct light to the first region of the second out-coupling diffractive optical element and to the second region of the first out-coupling diffractive optical element of the first one of the two apparatuses; and
a fourth optical projection engine configured to project polychromatic light into the first and second in-coupling diffractive optical elements which are respectively configured to direct light to the first region of the second out-coupling diffractive optical element and to the second region of the first out-coupling diffractive optical element of the second one of the two apparatuses.

13. A binocular near-eye display according to claim 11, wherein the at least one additional optical projection engine is configured to project polychromatic light by temporal or spatial interlacing into the first and second in-coupling diffractive optical elements which are respectively configured to direct light to the first region of the second out-coupling diffractive optical element and to the second region of the first out-coupling diffractive optical element of both of the two apparatuses.

14. A method comprising:
emitting a first pattern of light of a first wavelength from a first region of a first out-coupling diffractive optical element and a second pattern of light of a second wavelength from a second region of the first out-coupling diffractive optical element adjacent to the first region;
emitting light of the first wavelength in the second pattern from a first region of a second out-coupling diffractive optical element and light of the second wavelength in the first pattern from a second region of the second out-coupling diffractive optical element adjacent to the first region;
superposing and aligning the first patterns of light emitted from the first region of the first out-coupling diffractive optical element and from the second region of the second out-coupling diffractive optical element; and superposing and aligning the second patterns of light emitted from the second region of the first out-coupling diffractive optical element and from the first region of the second out-coupling diffractive optical element.

15. A method according to claim 14, further comprising:

projecting polychromatic light with the first pattern into one of a first pair of in-coupling diffractive optical elements with a first repeated diffraction spacing corresponding to the first wavelength and into one of a second pair of in-coupling diffractive optical elements with a second repeated diffraction spacing corresponding to the second wavelength;

projecting polychromatic light with the second pattern into the other of the first pair of in-coupling diffractive optical elements with the first repeated diffraction spacing and into the other of the second pair of in-coupling diffractive optical elements with the second repeated diffraction spacing;

transmitting the first pattern of light from said one of the first pair of in-coupling diffractive optical elements to the first region of the first out-coupling diffractive optical element and from said one of the second pair of in-coupling diffractive optical elements to the second region of the second out-coupling diffractive optical element; and transmitting the second pattern of light from said other of the first pair of in-coupling diffractive optical elements to the first region of the second out-coupling diffractive optical element and from said other of the second pair of in-coupling diffractive optical elements to the second region of the first out-coupling diffractive optical element.

* * * * *